(12) United States Patent
Yang et al.

(10) Patent No.: US 9,065,661 B2
(45) Date of Patent: Jun. 23, 2015

(54) SCALABLE MULTICAST ROUTE DISTRIBUTION IN A MULTITENANT DATA CENTER FABRIC IN A NETWORK ENVIRONMENT

(71) Applicant: CISCO TECHNOLOGY, INC., San Jose, CA (US)

(72) Inventors: Yibin Yang, San Jose, CA (US); Chiajen Tsai, Cupertino, CA (US); Liqin Dong, San Jose, CA (US); Shyam Kapadia, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 65 days.

(21) Appl. No.: 13/787,453

(22) Filed: Mar. 6, 2013

(65) Prior Publication Data

US 2014/0254590 A1    Sep. 11, 2014

(51) Int. Cl.
*H04L 12/00* (2006.01)
*H04L 12/18* (2006.01)

(52) U.S. Cl.
CPC ..................................... *H04L 12/18* (2013.01)

(58) Field of Classification Search
CPC ............ H04L 12/56; H04L 12/5618–12/5619; H04L 12/58; H04L 12/44; H04L 12/4641; H04L 12/46; H04L 12/462; H04L 12/2424; H04L 12/5689; H04L 29/0621
USPC .............. 370/255–256, 395.2, 395.5, 395.53, 370/408–409; 709/223, 239, 243
See application file for complete search history.

(56) References Cited

U.S. PATENT DOCUMENTS

| 7,398,322 | B1* | 7/2008 | Perlman ........................ 709/239 |
| 7,720,009 | B2* | 5/2010 | Mellachervu et al. ......... 370/255 |
| 8,243,596 | B2* | 8/2012 | Fedders et al. ................ 370/230 |
| 2002/0026645 | A1* | 2/2002 | Son et al. ....................... 725/117 |
| 2002/0191541 | A1* | 12/2002 | Buchanan et al. ............. 370/230 |
| 2007/0073694 | A1* | 3/2007 | Picault et al. ..................... 707/9 |
| 2008/0232379 | A1* | 9/2008 | Mohamed et al. ........ 370/395.53 |
| 2013/0107753 | A1* | 5/2013 | Chen et al. ..................... 370/254 |
| 2013/0148491 | A1* | 6/2013 | Jha et al. ........................ 370/217 |
| 2014/0153578 | A1* | 6/2014 | Ould-Brahim ................ 370/392 |

OTHER PUBLICATIONS

D. Walton, et al., "Advertisement of Multiple Paths in BGP," Network Working Group, Internet Draft, Jun. 17, 2012, 9 pages; http://tools.ietf.org/html/draft-ietf-idr-add-paths-07.

(Continued)

*Primary Examiner* — Charles C Jiang
*Assistant Examiner* — Mohamed Kamara
(74) *Attorney, Agent, or Firm* — Patent Capital Group (57) ABSTRACT

A method is provided in one example embodiment and includes determining a route target ("RT") membership for a network element; determining at least one attribute for the RT membership; and advertising the RT membership with the at least one attribute to other network elements. The at least one attribute may include an RT membership type attribute for indicating whether the RT membership is due to a local virtual network connection, transit support, or both. Additionally or alternatively, the at least one attribute may include a distribution tree binding attribute for indicating a distribution tree for the RT membership.

20 Claims, 5 Drawing Sheets

(56) References Cited

OTHER PUBLICATIONS

P. Marques, et al., Constrained Route Distribution for Border Gateway Protocol/MultiProtocol Label Switcing (BGP/MPLS) Internet Protocol (IP) Virtual Private Networks (VPNs), Network Working Group, RFC 4684, 15 pages, Nov. 2006; http://www.ietf.org/rfc/rfc4684.txt.

Daniele Sgandurra, "Vinci," [retrieved and printed from the Internet Mar. 6, 2013], 2 pages; http://wwwold.iit.cnr.it/staff/daniele.sgandurra/vinci/.

F. Baiardi, et al., "Virtual Interacting Network Community: Exploiting Multi-Core Architectures to Increase Security," [retrieved and printed from the Internet Mar. 6, 2013], 1 page; http://wwwold.iit.cnr.it/staff/daniele.sgandurra/vinci/vinci_poster.jpg.

U.S. Appl. No. 13/788,602, filed Mar. 7, 2013, entitled "Efficient Handling of Multi-Destination Traffic in an Internet Protocol Fabric Data Center," Inventors: Yibin Yang, et al.

R. Perlman, "Routing Bridges (RBridges): Base Protocol Specification," Internet Engineering Task Force (IETF), RFC 6325, ISSN: 2070-1721, Jul. 2011, 99 pages; http://www.ietf.org/rfc/rfc6325.txt.

* cited by examiner

SCALABLE MULTICAST ROUTE DISTRIBUTION IN A MULTITENANT DATA CENTER FABRIC IN A NETWORK ENVIRONMENT

TECHNICAL FIELD

This disclosure relates in general to the field of computer networking and, more particularly, to techniques for enhancing a Border Gate Protocol ("BGP") route target constrain for scalable multicast route distribution.

BACKGROUND

TRILL, which stands for TRansparent Interconnect of Lots of Links, is an IETF standard that is implemented by devices referred to as routing bridges ("RBridges") or TRILL switches. An RBridge is a network device that implements the TRILL protocol and is compatible with previous IEEE 802.1 bridges, as well as IPv4 and IPv6 routers and end nodes. RBridges are invisible to current IP routers and, like such routers, terminate the bridge Spanning Tree Protocol ("STP"). RBridges in a campus share connectivity information amongst themselves using Intermediate System to Intermediate System ("IS-IS") link state protocol. Via IS-IS, connectivity is broadcast to all RBridges so that each RBridge is aware of all of the other RBridges as well as the connectivity therebetween. As a result, RBridges can compute pair-wise optimal paths for unicast frames, as well as distribution trees for unknown or multicast/broadcast frames.

TRILL combines the advantages of bridges and routers and is the application of link state routing to the VLAN-aware customer-bridging problem. Border Gateway Protocol ("BGP") is the protocol that makes core routing decisions on the Internet. A relatively new architecture for data center networking called Vinci has recently been introduced. The physical topology of this architecture is based on a two-tier fat-tree, where every leaf switch is connected to every spine switch and vice versa. In this architecture, TRILL may be used to enable data forwarding while BGP may be used for route distribution among leafs, via route reflectors ("RR").

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes determining (e.g., processing, evaluating, identifying, looking-up, etc.) a route target ("RT") membership for a network element; determining at least one attribute for the RT membership; and advertising the RT membership with the at least one attribute to other network elements. The attribute can involve any type of characteristic, property, feature, trait, symbol, identifier, field, flag, etc. For example, the at least one attribute may include an RT membership type attribute for indicating whether the RT membership is due to a local virtual network connection, transit support, or both. Additionally or alternatively, the at least one attribute may include a distribution tree binding attribute for indicating a distribution tree for the RT membership.

Example Embodiments

Multitenancy is an important feature for Virtual Interacting Network Community (Vinci). Vinci is a software architecture that can exploit virtualization to share in a secure way an information and communication technology infrastructure among a set of users with distinct security levels and reliability requirements. To this purpose, Vinci decomposes users into communities, each consisting of a set of users, their applications, a set of services and shared resources. Users with distinct privileges and applications with distinct trust levels belong to distinct communities. Each community is supported by a virtual network (i.e., a structured and highly parallel overlay that interconnects virtual machines (VMs), each built by instantiating one of a predefined set of VM templates). Some VMs of a virtual network run user applications, some protect shared resources, and some others control traffic among communities to discover malware or worms. Further VMs manage the infrastructure resources and configure the VMs at start-up. The adoption of several VM templates enables Vinci to minimize the complexity of each VM and increases the robustness of both the VMs and of the overall infrastructure.

A key multitenancy requirement is traffic isolation, so that a tenant's traffic is not visible to any other tenant. Such isolation can be achieved by assigning one or more virtual networks to each tenant such that traffic within a virtual network is isolated from traffic in other virtual networks. The primary functionality required is provisioning virtual networks, associating a virtual machine's NIC with the appropriate virtual network, and maintaining that association as the virtual machine is activated, migrated, and/or deactivated. Use of an overlay-based approach enables scalable deployment on large network infrastructures. In a multitenant Vinci architecture, virtual network identifiers ("VNIDs") are used to tag data frames for tenant differentiation. Additionally, VNIDs are also carried in route target ("RT") during BGP route distribution for tenant virtual routing and forwarding ("VRF") identification.

In Vinci, multicast forwarding relies on distribution trees calculated from TRILL Intermediate System to Intermediate System ("IS-IS") link state information, as described in Internet Engineering Task Force Request for Comments: 6325 ("IETF RFC 6325"). In general, RBridges build distribution trees and use the distribution trees for forwarding multidestination frames. Each distribution tree reaches all RBridges in the campus, is shared across all virtual local area networks ("VLANs"), and may be used for distributing a native frame in any VLAN. The distribution of any particular frame on a distribution tree may be pruned in different ways for different cases to avoid unnecessary propagation of the frame.

Distribution trees are bidirectional and, although a single tree is logically sufficient for an entire campus, computation of additional distribution trees may be warranted in certain cases to improve the efficiency with which multidestination frames may be delivered. In operation, an ingress leaf RBridge assigns a multicast frame to one of the distribution trees for forwarding. RBridges may perform pruning on the frame based on the VNID, Source ID ("S") and Group Destination IP address ("G") interests advertised through BGP Fabric Mroute Sub-Address Family Identifier ("SAFI").

As used herein, "Vinci" refers to a data center fabric architecture built on a spine-leaf topology that provides optimal connectivity at Layer-2 and Layer-3 between hosts that are connected to leaf switches in the fabric and between hosts and the external network. The control plane, enhanced forwarding semantics, and management techniques provide the framework to support Layer-2 or Layer-3 fabrics. Any suitable encapsulation can be used to transport packets across the fabric where the transit nodes switch only on the fabric overlay header. One implementation of the Vinci architecture is based on a TRILL fabric. The Layer-2 and Layer-3 traffic being forwarded between the leaf nodes may be encapsulated in a TRILL header. The nodes in the fabric that provide transit, such as the spine nodes, may switch traffic based on the RBridge nicknames in the TRILL header.

Figure 1:
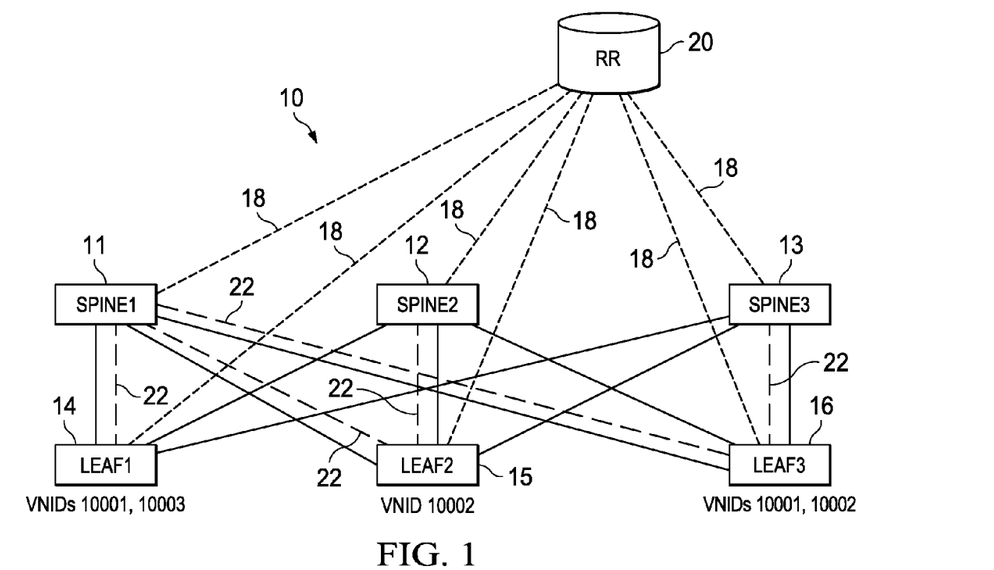
FIG. 1 is a block diagram of an example multitenant Vinci deployment in a TRILL communications network environment in accordance with aspects of one embodiment.

FIG. 1 depicts an example multitenant Vinci deployment in a TRILL network 10. As shown in FIG. 1, the network 10 may include six RBridges, three of which (spine1 11, spine2 12 and spine3 13) are implemented as spine switches and the remaining three of which (leaf1 14, leaf2 15, and leaf3 16) are implemented as leaf switches. Although not shown, it will be recognized that one or more host servers may be connected to each of the leaf RBridges 14-16. It will further be recognized that each such host server may host one or more virtual machines ("VMs") comprising members of one or more of the virtual networks identified by VNIDs 10001, 10002, and 10003. BGP adjacencies, represented by lines 18, are established between an RR 20 and each of the RBridges 11-16. Virtual network 10001 is connected to leaf1 14 and leaf3 16, virtual network 10002 is connected to leaf 2 15 and leaf3 16, and virtual network 10003 is connected only to leaf1 14. In one embodiment, a distribution tree, represented by lines 22, is rooted at spine1 11. Leaf RBridges, such as RBridges 14-16, use BGP to advertise multicast routes of their respective connected virtual networks to the RR 20. In order to support multicast pruning, the RR 20 needs to reflect these multicast routes to RBridges. It is desirable for the RR 20 to reflect a minimal number of multicast routes so that the RR and RBridge scalabilities can both be improved through requiring fewer route updates and routing table entries.

In BGP, a mechanism referred to as route target constrain ("RTC"), as described in detail in IETF RFC 4684 is commonly employed to reduce the number of routes being distributed. A BGP speaker advertises its interest in a set of routes associated with route targets through route target membership Network Layer Reachability Information ("NLRI"). The speaker's peers will send back routes based on the advertised RT membership NLRI, which can comprise a small subset of all routes. A special RT, referred to as a "default RT," may be used by a BGP speaker to indicate to its peer its willingness to receive all routes.

One approach to multicast route distribution is to distribute multicast routes to all spines and possibly all leafs to allow pruning at the source. This approach appears not to scale well, given the large number of tenants Vinci is required to support. One issue addressed by the embodiments described herein is how to take advantage of and fully leverage the RTC mechanism to minimize multicast route distribution so that scalability can be improved.

In accordance with features of embodiments described herein, RBridges may advertise their RT memberships based on their connectivity to virtual networks. Additionally, RBridges may advertise their RT memberships based on distribution tree topologies and possibly the RT membership information for other RBridges in the network. For ease of explanation, it will be assumed throughout this document that TRILL is used for purposes of illustration only and that the teachings set forth herein are equally applicable to FabricPath or other equivalent data center architectures. It will be further assumed that leafs should perform pruning on sourced and forwarded traffic. Leaf pruning, especially on forwarded traffic, may be less important given the two-tier fat-tree-topology and mandatory spine pruning. However, the embodiments will be described without applying that assumption so that they can be applied to arbitrary topologies and independently of other RBridges' pruning capabilities.

Figure 2:
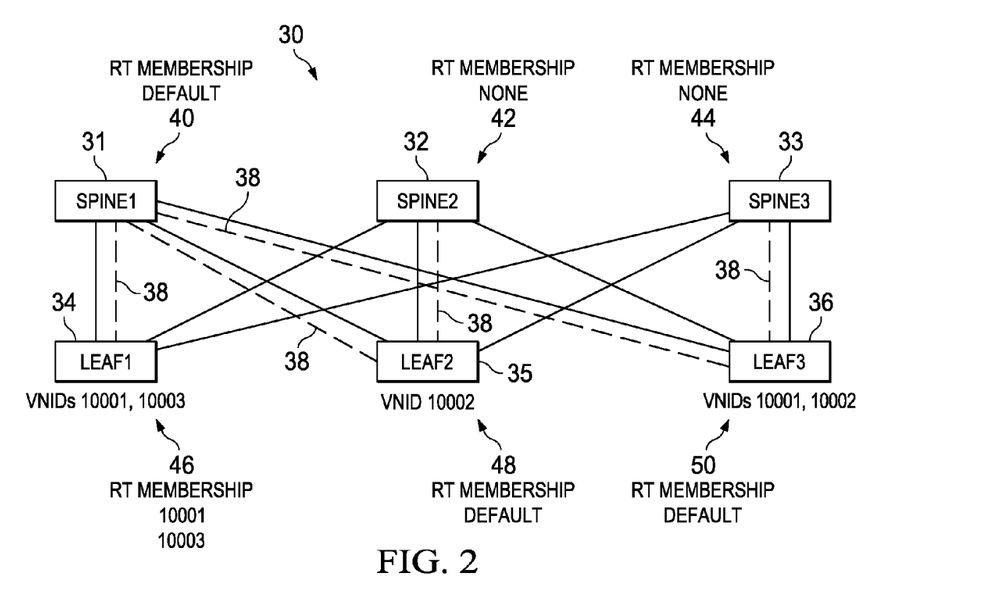
FIGS. 2-3 are block diagrams of an example multitenant Vinci deployment in a TRILL communications network environment illustrating a first approach for implementing scalable multicast route distribution in accordance with aspects of one embodiment.
Figure 3:
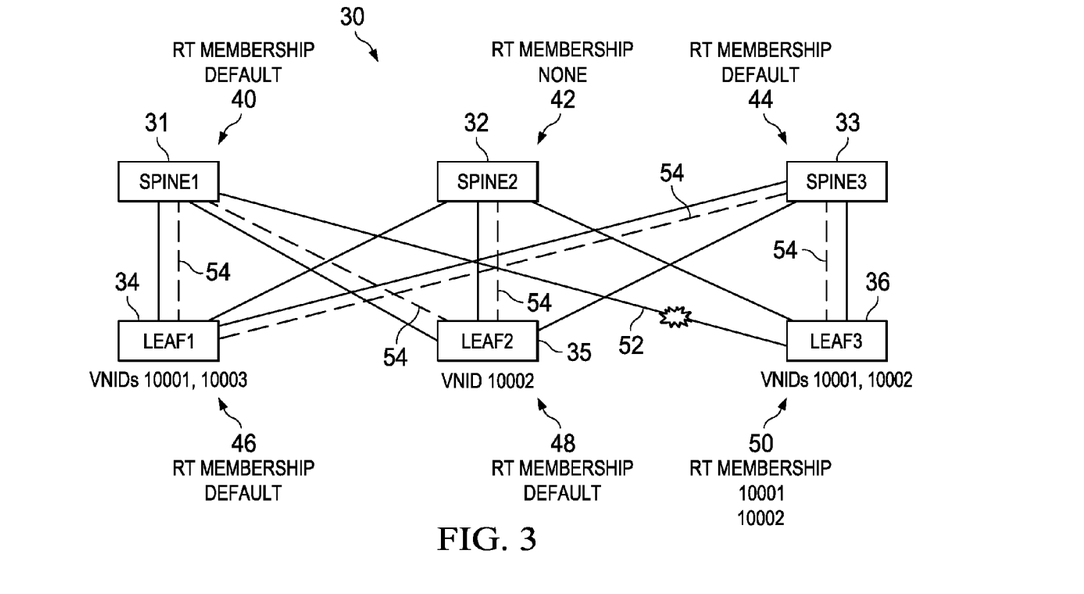

Three different approaches will be described herein. In a first approach, each RBridge examines distribution tree topologies and determines whether it functions as a transit node in any distribution tree. If the RBridge does function as a transit node in any distribution tree, it will advertise default RT membership to request all routes from the RR. This approach requires no change to the RTC mechanism as specified in the aforementioned IETF RFC 4684. FIGS. 2 and 3 illustrate this first approach. In particular, FIGS. 2 and 3 depict a multitenant Vinci deployment in a TRILL network 30. As shown in FIGS. 2 and 3, the network 30 may include six RBridges, three of which (spine1 31, spine2 32, and spine3 33) are implemented as spine switches and the remaining three of which (leaf1 34, leaf2 35, and leaf3 36) are implemented as leaf switches. BGP adjacencies are established between an RR (not shown) and each of the RBridges 31-36. Similar to the network 10 shown in FIG. 1, there are three virtual networks overlaid on the network 30 and identified by VNIDs 10001, 10002, and 10003, respectively. Although not shown, it will be recognized that one or more host servers may be connected to each of the leaf RBridges 34-36. It will further be recognized that each such host server may host one or more virtual machines ("VMs") comprising members of one or more of the virtual networks identified by VNIDs 10001, 10002, and 10003. Virtual network 10001 is connected to leaf1 34 and leaf3 36, virtual network 10002 is connected to leaf 2 35 and leaf3 36, and virtual network 10003 is connected only to leaf1 34. As noted above, the leaf RBridges 34-36 use BGP to advertise multicast routes of their respective connected virtual networks to the RR (not shown), which, in order to support multicast pruning, needs to reflect these multicast routes to the RBridges. Referring now only to FIG. 2, in the embodiment illustrated therein, a distribution tree, represented by lines 38, is rooted at spine1 31.

In FIG. 2, since spine1 31 serves as a transit node for the distribution tree 38 rooted at spine1 31, it will advertise the default route target membership in its RT membership list 40. As a result, spine1 31 will receive all multicast routes from the RR and perform multicast pruning accordingly. In contrast, spine2 32 and spine3 33 are not transit nodes; therefore, they will advertise no route target membership in their respective RT membership lists 42, 44. Since no multicast route is sent from the RR to spine2 32 or spine3 33, scalability can be improved. Similarly, with regard to the leaf nodes 34-36, leaf1 34 is not a transit node; therefore, it will only advertise the VNIDs with which it is associated (10001 and 10003) in its RT membership list 46. In contrast, leaf2 35 and leaf3 36 are both transit nodes; therefore, each will advertise the default route target membership in its respective RT membership list 48, 50. As a result, leaf2 35 and leaf3 36 will receive all multicast routes from the RR and perform multicast pruning accordingly.

Referring now to FIG. 3, it will be assumed that a link 52 between spine1 31 and leaf3 36 is broken. As a result of the broken link 52, the distribution tree must be recalculated, with the recalculated distribution tree represented by lines 54 and still rooted at spine1 31. In the distribution tree 54, spine1 31, spine3 33, leaf1 34, and leaf2 35 are now transit nodes. As a result, they will advertise default RT memberships in their respective RT membership lists 40, 44, 46, and 48 to request all routes from the RR. In contrast, spine2 32 is not a transit node in the distribution tree 54; therefore, it will advertise no route target membership in its RT membership list 42. Leaf3 36 is also not a transit node; therefore, it will only advertise the VNIDs with which it is associated (10001 and 10002) in its RT membership list 50.

Given its simplicity, the approach illustrated in FIGS. 2 and 3 results in transit nodes indiscriminately requesting all multicast routes. This can lead to unnecessary route updates. For example, in FIG. 2, spine1 31 should skip multicast routes associated with route target 10003, as virtual network 10003 is local to leaf1 34. As another example, in FIG. 3, spine1 31 should skip multicast routes associated with route target 10001, as it does not forward traffic of virtual network 10001. Similarly, in FIG. 3, both spine1 31 and spine3 33 should skip multicast routes associated with route target 10003, as virtual network 10003 is local to leaf1 34.

To address these issues, a second approach is described below in which each transit node is made aware of other RBridges RT memberships and advertises its own RT memberships accordingly. This second approach offers several enhancements. For example, in order to allow an RBridge to know the RT membership information of other RBridges, ADD-PATH capability, as specified in draft-ietf-idr-add-paths-07, entitled "Advertisement of Multiple Paths in BGP," is enabled for RTC SAFI over the BGP adjacencies. In this manner, the RR can advertise an RT membership with multiple RBridges as nexthops and therefore an RBridge's RT membership will be known by all other RBridges. Additionally, in order to allow a transit RBridge to derive its RT memberships, a new BGP path attribute, designated "RT Membership Type," is provided to indicate whether an RT membership is advertised due to a local virtual network connection or transit support. In the former case, the RT membership is of type endpoint, while in the latter case, the RT membership is of type transit. It should be noted that an RT membership can be both endpoint and transit, as a transit node may also have a direct connection to a virtual network. The differentiation is required because only the RT membership that is due to local virtual network connections should be used by a transit node to derive its own RT memberships, as further clarified hereinbelow.

Figure 4:
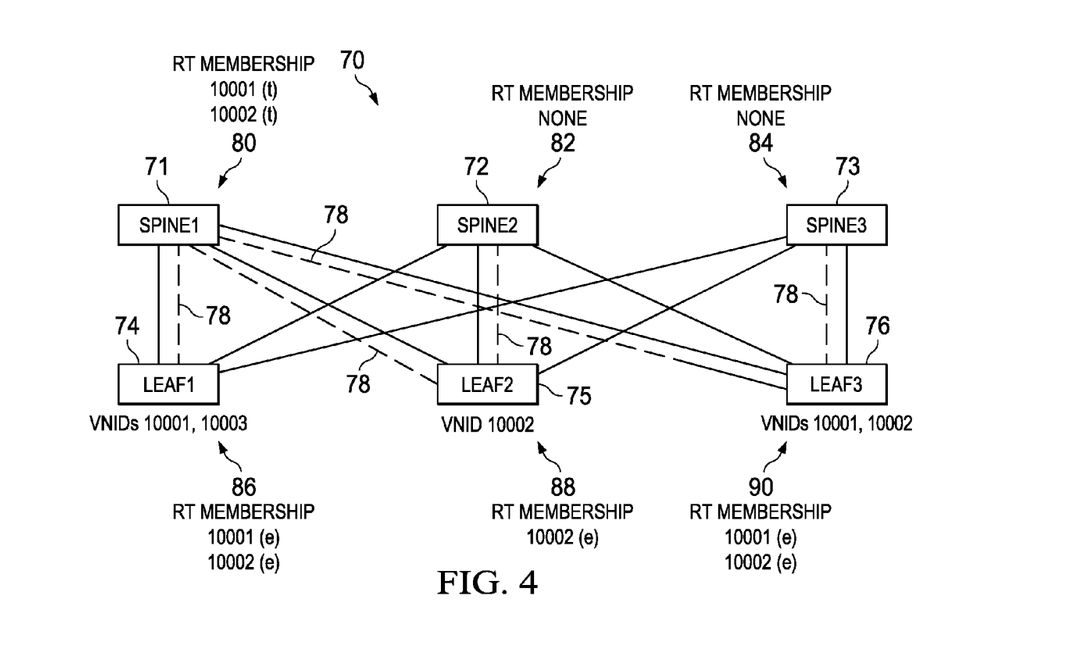
FIGS. 4-6 are block diagrams of an example multitenant Vinci deployment in a TRILL communications system illustrating a second approach for implementing scalable multicast route distribution in accordance with aspects of one embodiment.
Figure 5:
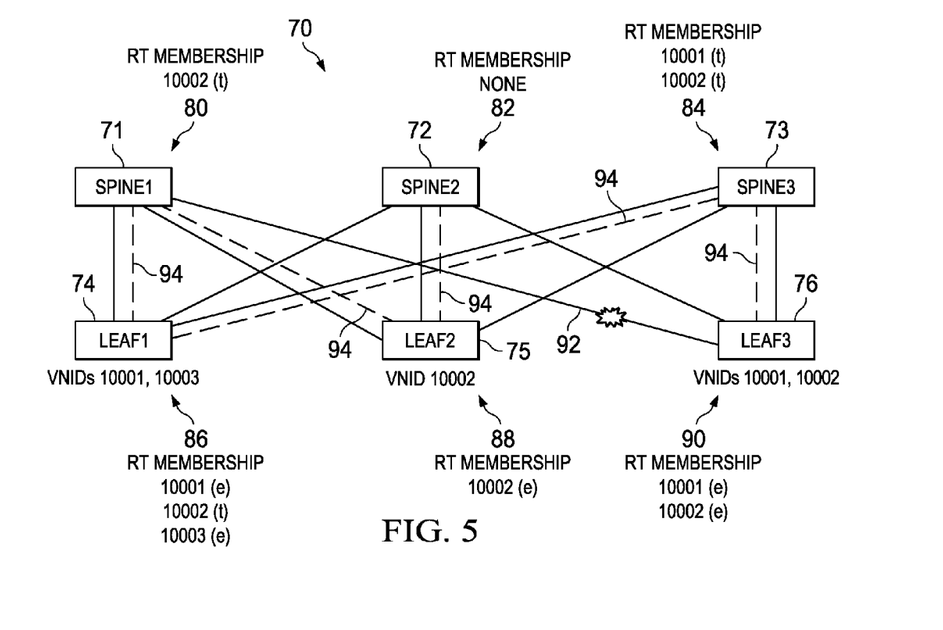
Figure 6:
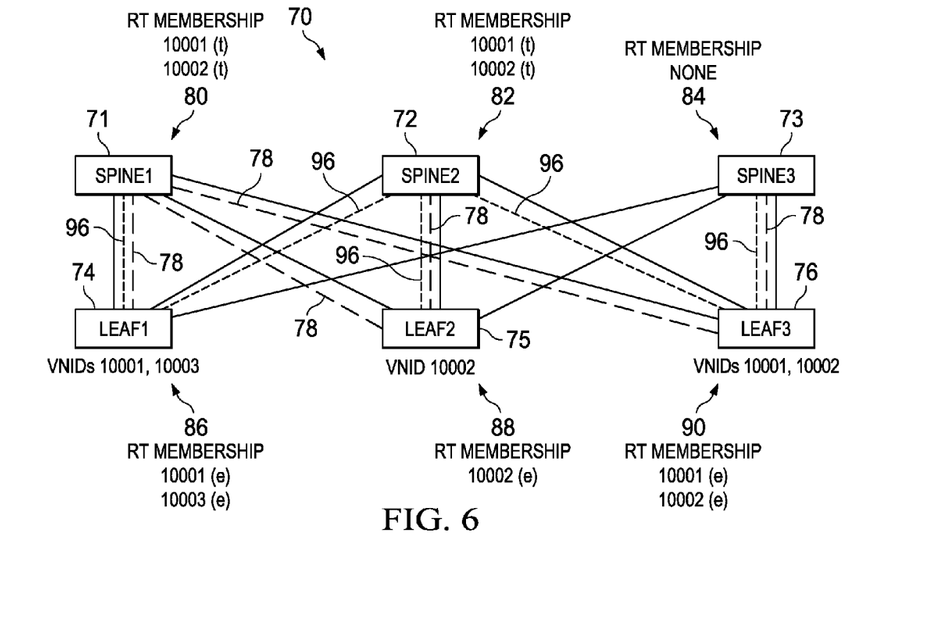

This second approach is illustrated in FIGS. 4, 5, and 6. In particular, in the approach illustrated in FIGS. 4-6, RT memberships are annotated with a type: (e) means type endpoint, while (t) means type transit. FIGS. 4-6 depict a multitenant Vinci deployment in a TRILL network 70. As shown in FIGS. 4-6, the network 70 may include six RBridges, three of which (spine1 71, spine2 72, and spine3 73) are spine switches and the remaining three of which (leaf1 74, leaf2 75, and leaf3 76) are leaf switches. BGP adjacencies are established between an RR (not shown) and each of the RBridges 71-76. Similar to the network 10 shown in FIG. 1, there are three virtual networks overlaid on the network 70 and identified by VNIDs 10001, 10002, and 10003, respectively. Although not shown, it will be recognized that one or more host servers may be connected to each of the leaf RBridges 74-76. It will further be recognized that each such host server may host one or more virtual machines ("VMs") comprising members of one or more of the virtual networks identified by VNIDs 10001, 10002, and 10003. Virtual network 10001 is connected to leaf1 74 and leaf3 76, virtual network 10002 is connected to leaf2 75 and leaf3 76, and virtual network 10003 is connected only to leaf1 74. As noted above, the leaf RBridges 74-76 use BGP to advertise multicast routes of their respective connected virtual networks to the RR (not shown), which, in order to support multicast pruning, needs to reflect these multicast routes to the RBridges. In the embodiment illustrated in FIG. 4, a distribution tree, represented by lines 78, is rooted at spine1 71. Additionally, RT membership list 80-90 are associated with each of the RBridges 71-76, respectively.

As shown in FIG. 4, since spine1 71 learns endpoint RT memberships of all leafs 74-76, spine1 can determine for which virtual network(s) it serves as a transit node based on the distribution tree topology. For example, spine1 71 does not serve as a transit node for virtual network 10003, so it does not advertise RT membership 10003 in its RT membership list 80. As a result, it will prune all multicast traffic in virtual network 10003, regardless of multicast destination address. Spine1 71 does, however, serve as a transit node for virtual networks 10001 and 10002, so it advertises both of those memberships, with type transit (denoted in the membership list as "(t)") in its membership list 80. Spine2 72 and spine3 73 both advertise no memberships in their respective RT membership lists 82, 84. Each of the leaf nodes 74, 75, and 76, advertise their respective virtual network memberships, designated as type endpoint (denoted in the membership lists as "(e)") in their respective RT membership lists 86, 88, and 90.

Referring to FIG. 5, it will be assumed for the sake of example that a link 92 between spine1 71 and leaf3 76 is broken and the distribution tree is recalculated, as represented by lines 94. Compared to FIG. 3, in addition to not advertising RT membership 10003 in its RT membership list 80, spine1 71 (as depicted in FIG. 5) also does not advertise RT membership 10001, which will reduce the number of routes being distributed. The membership list 82 for spine1 72 remains empty; however, spine3 73 has become a transit node for virtual networks 10001 and 10002, which is reflected in its updated RT membership list 84 as shown in FIG. 5. Additionally, leaf1 74 has become a transit node for virtual network 10002; therefore, the RT membership list 86 is updated to reflect that RT membership. The RT membership lists 88 and 90 remain unaffected by the new distribution tree 94.

FIG. 6 depicts a multi-tree case for the second approach illustrated in FIGS. 4 and 5 and highlights the value of the RT Membership Type attribute. Referring to FIG. 6, in addition to the distribution tree 78 rooted at spine1 71, there is a second distribution tree rooted at spine2 72 and represented by lines 96. Spine2 72 serves as a transit node for virtual networks 10001 and 10002 in the distribution tree 96; this is reflected in the RT membership list 82 for spine2 72. With regard to the first distribution tree 78, if RT memberships advertised by spine2 72 were not designated as type transit, leaf2 75 would consider itself a transit node for route target 10001 and advertise RT membership in 10001. This could also lead to unnecessary route distribution to leaf2 75.

FIG. 6 also highlights a need for additional RT membership attribution. Consider spine1 71, which serves as a transit node for the distribution tree 78, and spine2 72, which serves as a transit node for distribution tree 96. For the distribution tree 78, spine1 71 needs to have multicast routes with route targets 10001 and 10002, while for the distribution tree 78, spine1 does not need any multicast routes. In contrast, for the distribution tree 78, spine2 72 does not need any multicast routes, while for the distribution tree 96, spine2 needs to have multicast routes with route targets 10001 and 10002. Since it is not known which of the distribution trees 78, 96 a particular virtual network will use, spine1 71 and spine2 72 have to maintain multicast routes for both virtual networks. Even if an ingress leaf binds the traffic of a virtual network to a subset of all distribution trees, the approach as illustrated in FIGS. 4-6 cannot take advantage of this binding to reduce the number of multicast routes being distributed.

Figure 7:
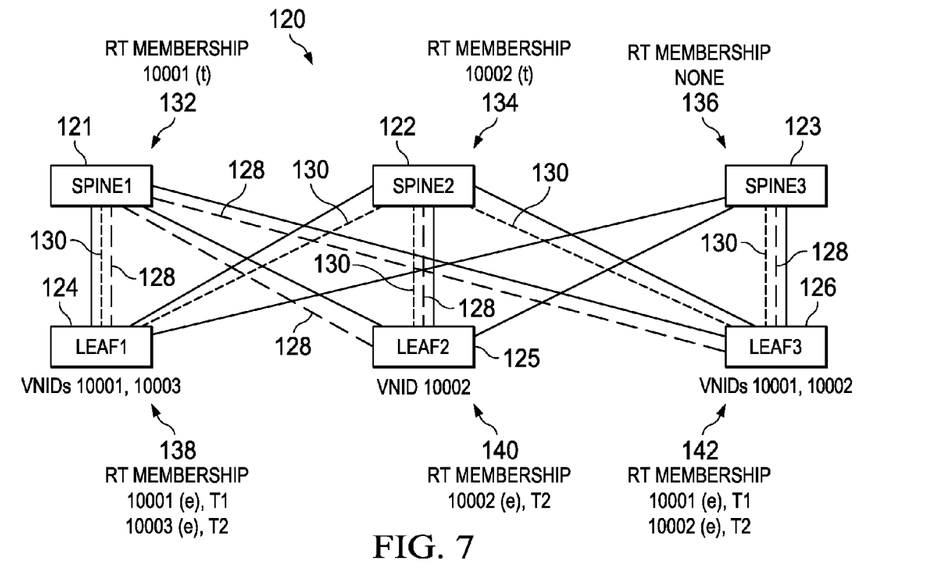
FIG. 7 is a block diagram of an example multitenant Vinci deployment in a TRILL communications system illustrating a third approach implementing scalable multicast route distribution in accordance with aspects of one embodiment.

FIG. 7 depicts a multitenant Vinci deployment in a TRILL network 120. As shown in FIG. 7, the network 120 may include six RBridges, three of which (spine1 121, spine2 122, and spine3 123) are spine switches and the remaining three of which (leaf1 124, leaf2 125, and leaf3 126) are leaf switches. BGP adjacencies are established between an RR (not shown) and each of the RBridges 121-126. Similar to the network 10 shown in FIG. 1, there are three virtual networks overlaid on the network 120 and identified by VNIDs 10001, 10002, and 10003, respectively. Although not shown, it will be recognized that one or more host servers may be connected to each of the leaf RBridges 124-126. It will further be recognized that each such host server may host one or more virtual machines ("VMs") comprising members of one or more of the virtual networks identified by VNIDs 10001, 10002, and 10003. Virtual network 10001 is connected to leaf1 124 and leaf3 126, virtual network 10002 is connected to leaf 2 125 and leaf3 126, and virtual network 10003 is connected only to leaf1 124. As noted above, the leaf RBridges 124-126 use BGP to advertise multicast routes of their respective connected virtual networks to the RR (not shown), which, in order to support multicast pruning, needs to reflect these multicast routes to the RBridges. In the embodiment illustrated in FIG. 7, two distribution trees are shown. A first distribution tree, represented by lines 128, is rooted at spine1 121 ("tree1" or "T1"). A second distribution tree, represented by lines 130, is rooted at spine2 122 ("tree2" or "T2"). Additionally, RT membership lists 132-142 are associated with each of the RBridges 121-126, respectively.

The approach illustrated in FIG. 7 allows leaf RBridges, such as leaf1 124, leaf2 125, and leaf3 126, to advertise their virtual network and distribution tree bindings. A new BGP path attribute, designated "Distribution Tree Binding," is introduced to designate the distribution tree(s) used for a specific route target. It should be noted that one virtual network represented by a route target, can use multiple distribution trees. FIG. 7 depicts the third approach, with RT memberships annotated with an indicator of the distribution tree being used (e.g., T1 or T2). The Distribution Tree Binding attribute allows the transit nodes spine1 121 and spine2 122 to learn that virtual networks 10001 and 10002 use only the first and second distribution trees, respectively, can advertise RT memberships 10001 and 10002, respectively.

In particular, the RT membership list 138 for leaf1 124 advertises that that the node's RT membership 10001 is type endpoint and has a distribution tree binding of T1. The RT membership list 138 for the leaf1 124 further advertises that the node's RT membership 10003 is type endpoint and has a distribution tree binding of T2. Similarly, the RT membership list 140 for leaf2 125 advertises that the node's RT membership 10002 is type endpoint and has a distribution tree binding of T2. Finally, the RT membership list 140 for leaf3 126 advertises that the node's RT membership 10001 is type endpoint and has a distribution tree binding of T1. The RT membership list 140 further advertises that the node's RT membership 10002 is type endpoint and has a distribution tree binding of T2. In one embodiment, Distribution Tree Binding attributes are only determined for RT memberships having an RT Membership Type of endpoint. Compared to the approach illustrated in FIGS. 4-6, multicast route distribution is even further reduced.

Figure 8:
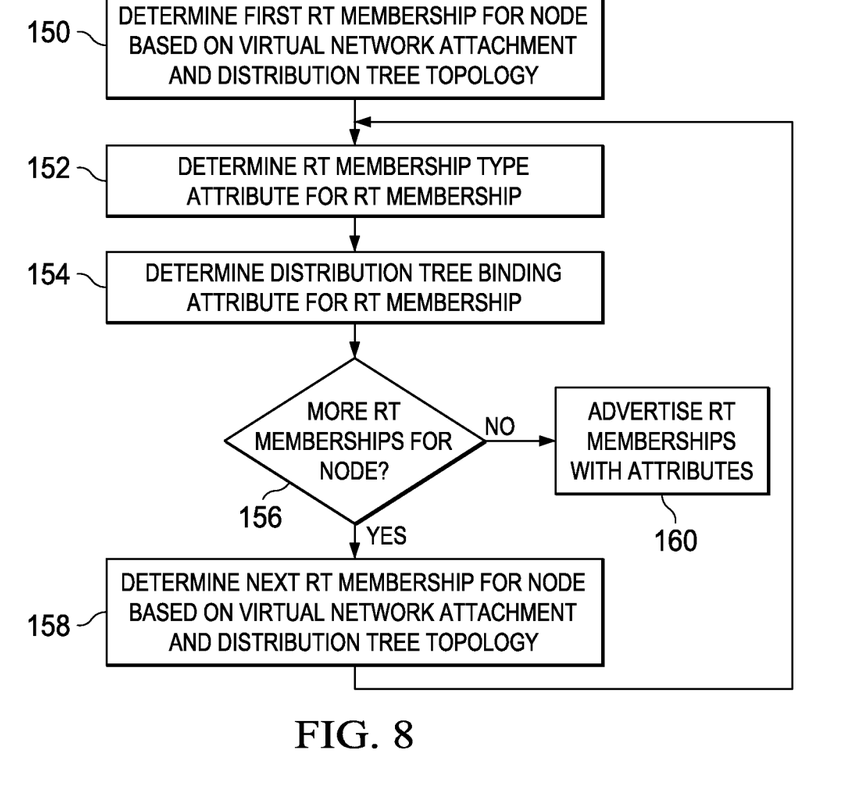
FIG. 8 is a flowchart illustrating operation of an exemplary embodiment implementing scalable multicast route distribution in accordance with aspects of various embodiments.

FIG. 8 is a flowchart illustrating operation of an exemplary embodiment implementing scalable multicast route distribution in accordance with aspects of various embodiments. It will be recognized that the technique illustrated in and described with reference to FIG. 8 may be implemented by each node, or RBridge, in a data center or other network, such as the networks 30, 70 and 120, for implementing various features described herein. Referring to FIG. 8, in step 150, a first RT membership is determined for the node based on virtual network attachment or distribution tree topology. As described above, the RT membership may identify a VNID of a private network to which a VM hosted on a server connected to the node is a connected. For example, referring to FIG. 7, a first RT membership for leaf1 124 is VNID 10001. In step 152, an RT Membership Type attribute is determined for the RT membership. Using the previous example, an RT Membership Type attribute for VNID 10001 of leaf1 124 is endpoint, or "(e)". In step 154, the distribution tree binding is determined for the RT membership. Using the previous example once again, a Distribution Tree Binding attribute for VNID 10001 of leaf1 124 is the first distribution tree, or "T1." As noted above, in one embodiment, Distribution Tree Binding attributes are only determined for RT memberships having an RT Membership Type of endpoint. In step 156, a determination is made whether there are more RT memberships for the node based on virtual network attachment or distribution tree topology. If so, execution proceeds to step 158, in which a next RT membership is determined for the node. Referring once again to the previous example, a next RT membership for the node leaf1 124 is VNID 10003. Returning to FIG. 8, execution then returns to 152 and the process repeats for the next RT membership. If in step 156 it is determined that there are no more RT memberships for the node, execution proceeds to step 160, in which the RT memberships with attributes are advertised via BGP.

In one example implementation, various devices involved in implementing the embodiments described herein can include software for achieving the described functions. For example, referring to FIG. 9, each of the RBridges of the embodiments described herein, represented in FIG. 9 by an RBridge 180, may include a RTC module 182, which comprises software embodied in one or more tangible media for facilitating the activities described herein. The RBridge 180 may also include a memory device (or memory element) 184 for storing information to be used in achieving the functions as outlined herein. Additionally, the RBridge 180 may include a processor 186 that is capable of executing software or an algorithm (such as embodied in module 182) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Figure 9:
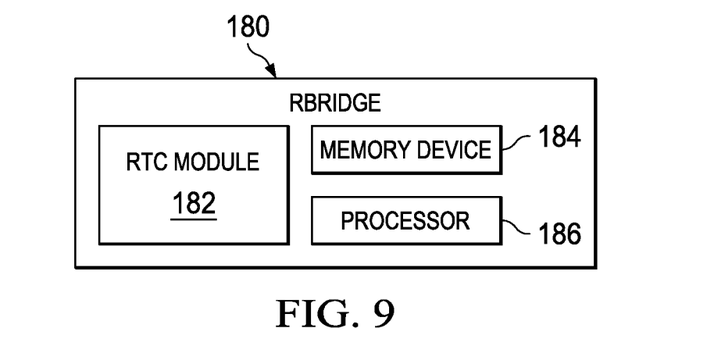
FIG. 9 is a simplified block diagram of a network node comprising an RBridge for implementing scalable multicast route distribution in accordance with aspects of one embodiment.

Note that in certain example implementations, the functions outlined herein (and detailed with respect to FIG. 8) may be implemented by logic encoded in one or more non-transitory tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 9, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein (e.g., the various RBridges) can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
    determining at least one route target ("RT") membership for a network element based on a virtual network attachment and a distribution tree topology for the network element, wherein the RT membership indicates a multicast route that the network element is to receive; and for each of the at least one RT memberships:
determining at least one attribute for the RT membership; and
advertising the RT membership with the at least one attribute to other network elements.

2. The method of claim 1, wherein the at least one attribute comprises an RT membership type attribute.

3. The method of claim 2, wherein the RT membership type attribute comprises an indication of whether the network element is an endpoint for the multicast.

4. The method of claim 1, wherein the at least one attribute comprises a distribution tree binding attribute.

5. The method of claim 4, wherein the distribution tree binding attribute comprises an indication of a distribution tree for the RT membership.

6. The method of claim 1, wherein the determining an RT membership for a network element comprises determining a plurality of RT memberships for the network element.

7. The method of claim 6 further comprising:
for each of the RT memberships, determining at least one attribute for the RT membership; and
advertising all of the RT memberships with their respective at least one attribute to other network elements.

8. The method of claim 1, wherein the network element comprises a Routing Bridge ("RBridge") for implementing a TRansparent Interconnection of Lots of Links ("TRILL") network.

9. One or more non-transitory computer-readable media that includes code for execution and when executed by a processor is operable to perform operations comprising:
determining at least one route target ("RT") membership for a network element based on a virtual network attachment and a distribution tree topology for the network element, wherein the RT membership indicates a multicast route that the network element is to receive; and
for each of the at least one RT memberships:
determining at least one attribute for the RT membership; and
advertising the RT membership with the at least one attribute to other network elements.

10. The media of claim 9, wherein the at least one attribute comprises an RT membership type attribute.

11. The media of claim 10, wherein the RT membership type attribute comprises an indication of whether the network element is an endpoint for the multicast.

12. The media of claim 9, wherein the at least one attribute comprises a distribution tree binding attribute.

13. The media of claim 12, wherein the distribution tree binding attribute comprises an indication of a distribution tree for the RT membership.

14. The media of claim 9, wherein the determining an RT membership for a network element comprises determining a plurality of RT memberships for the network element.

15. The media of claim 14, wherein the media further includes code for execution and when executed by a processor is operable to perform operations comprising:
for each of the RT memberships, determining at least one attribute for the RT membership; and
advertising all of the RT memberships with their respective at least one attribute to other network elements.

16. An apparatus comprising:
a memory element configured to store a route target constrain ("RTC") module; and
a processor operable to execute instructions associated with the the RTC module;
wherein the RTC module is configured to:
determine at least one a route target ("RT") membership for a network element based on a virtual network attachment and a distribution tree topology for the network element, wherein the RT membership indicates a multicast route that the network element is to receive; and
for each of the at least one RT memberships:
determine at least one attribute for the RT membership; and
advertise the RT membership with the at least one attribute to other network elements.

17. The apparatus of claim 16, wherein the RT membership type attribute comprises an indication of whether the network element is an endpoint for the multicast.

18. The apparatus of claim 16, wherein the at least one attribute comprises a distribution tree binding attribute for indicating a distribution tree for the RT membership.

19. The apparatus of claim 16 wherein the determining an RT membership for a network element comprises determining a plurality of RT memberships for the network element.

20. The apparatus of claim 16, wherein the network element comprises a Routing Bridge ("RBridge") for implementing a TRansparent Interconnection of Lots of Links ("TRILL") network.

* * * * *